United States Patent [19]

Dixon et al.

[11] Patent Number: 5,450,544
[45] Date of Patent: Sep. 12, 1995

[54] METHOD AND APPARATUS FOR DATA BUFFERING AND QUEUE MANAGEMENT OF DIGITAL MOTION VIDEO SIGNALS

[75] Inventors: Doug Dixon, Hopewell; Judith Goldstein, Browns Mills, both of N.J.; Michael Keith, Holland, Pa.

[73] Assignee: Intel Corporation, Santa Clara, Calif.

[21] Appl. No.: 357,544

[22] Filed: Dec. 16, 1994

Related U.S. Application Data

[63] Continuation of Ser. No. 901,600, Jun. 19, 1992, abandoned.

[51] Int. Cl.⁶ .................................................. G06T 1/00
[52] U.S. Cl. ..................................... 395/164; 345/202
[58] Field of Search ................ 395/154, 164; 364/188, 364/715.02; 345/202; 348/714, 715, 718; 382/56

[56] References Cited

U.S. PATENT DOCUMENTS

| | | | |
|---|---|---|---|
| 4,499,576 | 2/1985 | Fraser | 370/60 |
| 4,507,760 | 3/1985 | Fraser | 365/221 |
| 4,682,284 | 7/1987 | Schrofer | 364/200 |
| 4,803,654 | 2/1989 | Rasberry et al. | 364/900 |
| 4,809,155 | 2/1989 | Costes et al. | 364/200 |
| 4,857,910 | 8/1989 | Baunach | 340/799 |
| 4,920,432 | 4/1990 | Eggers et al. | 360/33.1 |
| 4,958,378 | 9/1990 | Bell | 382/34 |
| 4,989,073 | 1/1991 | Wagner | 348/715 |
| 5,008,951 | 4/1991 | Koshi | 382/56 |
| 5,043,981 | 8/1991 | Firoozmand et al. | 370/85.1 |
| 5,046,122 | 1/1991 | Nakaya et al. | 382/56 |
| 5,058,186 | 10/1991 | Miyaoka et al. | 382/56 |
| 5,088,053 | 2/1992 | Sprague et al. | 345/202 |
| 5,091,782 | 2/1992 | Krause et al. | 382/56 |
| 5,208,745 | 5/1993 | Quentin et al. | 364/188 |
| 5,265,180 | 11/1993 | Golin | 382/56 |

OTHER PUBLICATIONS

Manepally et al., "Intel's i750 (R) Video Processor: The Programmable Solution", COMPCON Spring '91 (IEEE 1991), pp. 324–329.

Chapman et al., "Data Management in a Circular Buffer", IBM Technical Disclosure Bulletin, vol. 20 No. 8 (Jan. 1978) pp. 3309–3310.

Sun et al., "Motion-Compensated Vector Quantization with a Dynamic Codebook", 1990 IEEE Symposium on Circuits and Systems, (1990) pp. 1003–1006.

Cary et al., "Data Buffer Management", IBM Technical Disclosure Bulletin, vol. 24 No. 3 (Aug. 1981) pp. 1502–1503.

Primary Examiner—Heather R. Herndon
Assistant Examiner—N. Kenneth Burraston
Attorney, Agent, or Firm—William H. Murray

[57] ABSTRACT

A method and apparatus for storing a sequence of compressed frames of digital motion video information in a circular buffer is disclosed. In a preferred embodiment, compressed digital motion video information is written from a storage device to the circular buffer. A host pointer is set equal to the location corresponding to the end of the last frame of motion video information written to the circular buffer, and the positions of a microcode pointer and the host pointer are compared. Based on these positions, determinations are made regarding (i) whether a compressed frame of digital motion video information is present in the circular buffer and ready for decompression and (ii) whether a portion of the circular buffer can be re-written with compressed digital motion video data based on the positions of the microcode and host pointers.

2 Claims, 4 Drawing Sheets

METHOD AND APPARATUS FOR DATA BUFFERING AND QUEUE MANAGEMENT OF DIGITAL MOTION VIDEO SIGNALS

This is a continuation of application(s) Ser. No. 07/901,600 filed on Jun. 19, 1992 now abandoned.

FIELD OF THE INVENTION

This invention relates to video signal processing generally and particularly to systems for processing compressed and decompressed digital video signals representative of full color video signals.

BACKGROUND OF THE INVENTION

The personal computer has recently undergone a transformation from a text and numeric processing system to a tool for managing and communicating more complex types of digital information such as audio, still images and motion video. The addition of these "multimedia" data types places new requirements on computer systems and their operating environments. More particularly, multimedia data consumes massive amounts of storage space, and playback of full-motion digital video requires real-time decompression and high input/output bandwidth.

It is an object of the present invention to provide a system for efficiently buffering sequences of compressed multimedia data.

It is a further object of the present invention to provide a system for queuing sequences of uncompressed multimedia data.

It is a still further object of the present invention to provide a software system which is portable across various hardware environments and operating systems for supporting multimedia application software on a host computer.

Further objects and advantages of the invention will become apparent from the description of the invention which follows.

SUMMARY OF THE INVENTION

A method and apparatus for storing a sequence of compressed frames of digital motion video information in a circular buffer. In a preferred embodiment, compressed digital motion video information is written from a storage device to the circular buffer. A host pointer is set equal to the location corresponding to the end of the last frame of motion video information written to the circular buffer, and the positions of a microcode pointer and the host pointer are compared. Based on these positions, determinations are made regarding (i) whether a compressed frame of digital motion video information is present in the circular buffer and ready for decompression and (ii) whether a portion of the circular buffer can be re-written with compressed digital motion video data.

In a method and apparatus for processing a sequence of digital motion video frames provided from a decompression system and stored in a queue for display, the queue is formed from a plurality of storage locations. In a preferred embodiment, a next storage location containing a current frame is selected for receiving a next frame generated by the decompression system. Determinations are made regarding whether the current frame (i) has been copied to a display, (ii) is needed as a reference frame, and (iii) may be needed to refresh the display. Based on these determinations, the next frame is copied into the next storage location.

DETAILED DESCRIPTION OF THE PREFERRED EMBODIMENT

Figure 1A:
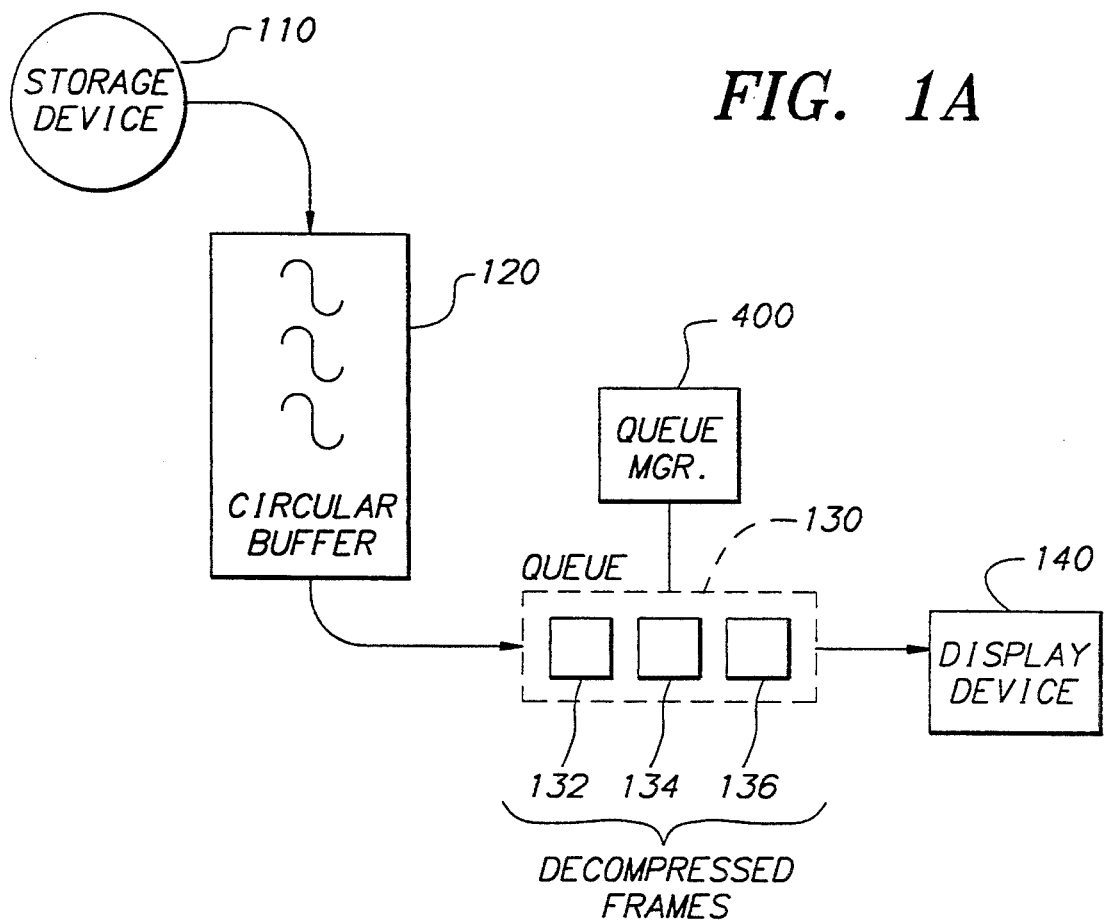
FIG. 1A is a flow diagram illustrating the operation of a system for displaying a digital video signal according to a preferred embodiment of the present invention.

Referring now to FIG. 1A, there is shown a flow diagram illustrating the operation of a system for displaying a digital video signal according to a preferred embodiment of the present invention. The display system controls the decompressing of video frames and the displaying of the decompressed frames on a computer screen or monitor. Compressed video data is provided to the display system by storage device 110. Circular buffer 120 is provided for storing compressed video data provided from storage device 110. Decompressed frames 132, 134, 136 derived from data in circular buffer 120 are stored in queue 130. A queue manager 400 controls the copying and transfer of information stored in decompressed frames 132, 134, 136 from queue 130 to display 140.

Figure 1B:
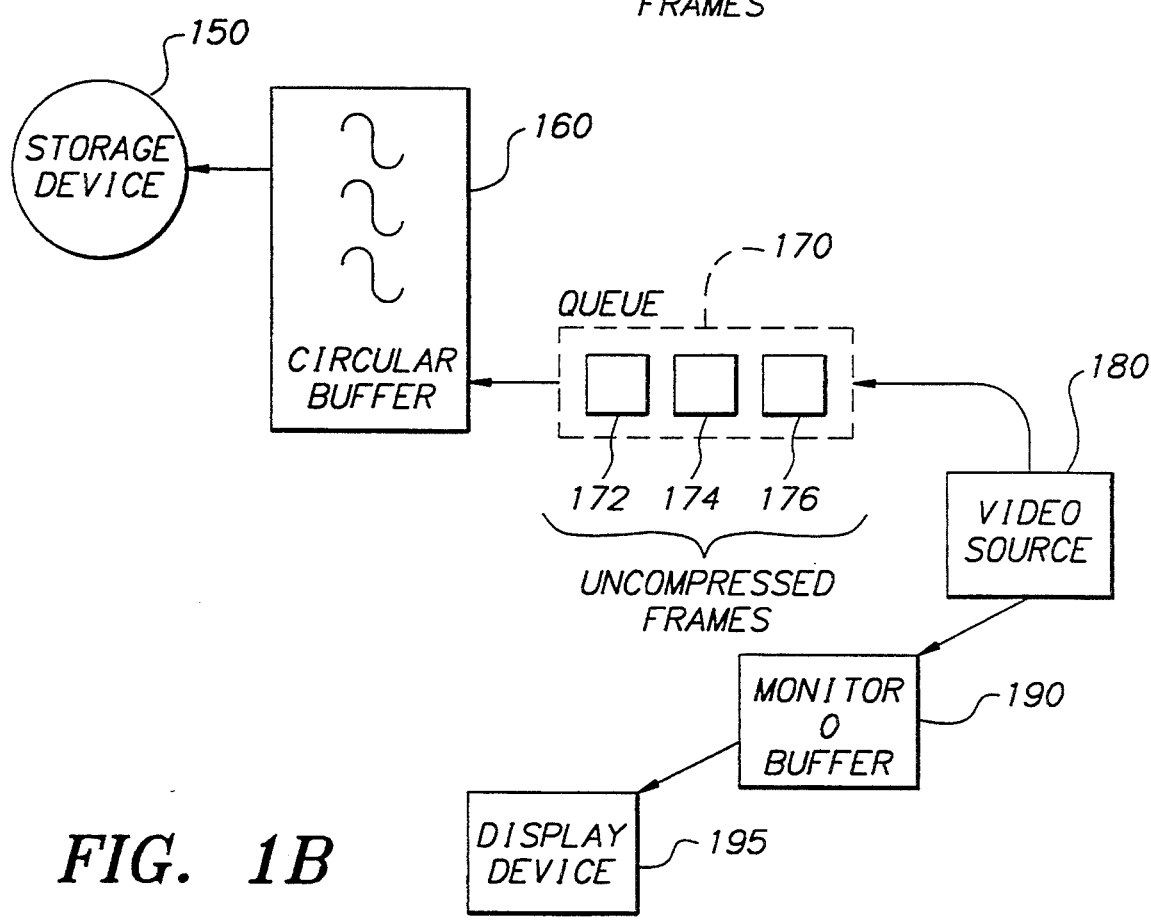
FIG. 1B is a flow diagram illustrating the operation of a system for capturing a digital video signal according to a preferred embodiment of the present invention.

Referring now to FIG. 1B, there is shown a flow diagram illustrating the operation of a system for capturing a digital video signal according to a preferred embodiment of the present invention. The capture system controls the compressing of digital video frames provided from video source 180 and the storage of compressed frames on storage device 150. Decompressed frames 176, 172, 174 provided from video source 180 are stored in queue 170. Circular buffer 160 is provided for storing compressed digital video data derived from uncompressed frames 170, 172, 174. Compressed digital video data from circular buffer 160 is provided to storage buffer 150. The capture system also functions to monitor the digital video frames provided from video source 180 on display 195. Monitor buffer 190 is provided for storing uncompressed frames provided by source 180 prior to the showing of such frames on display 195.

Figure 2:
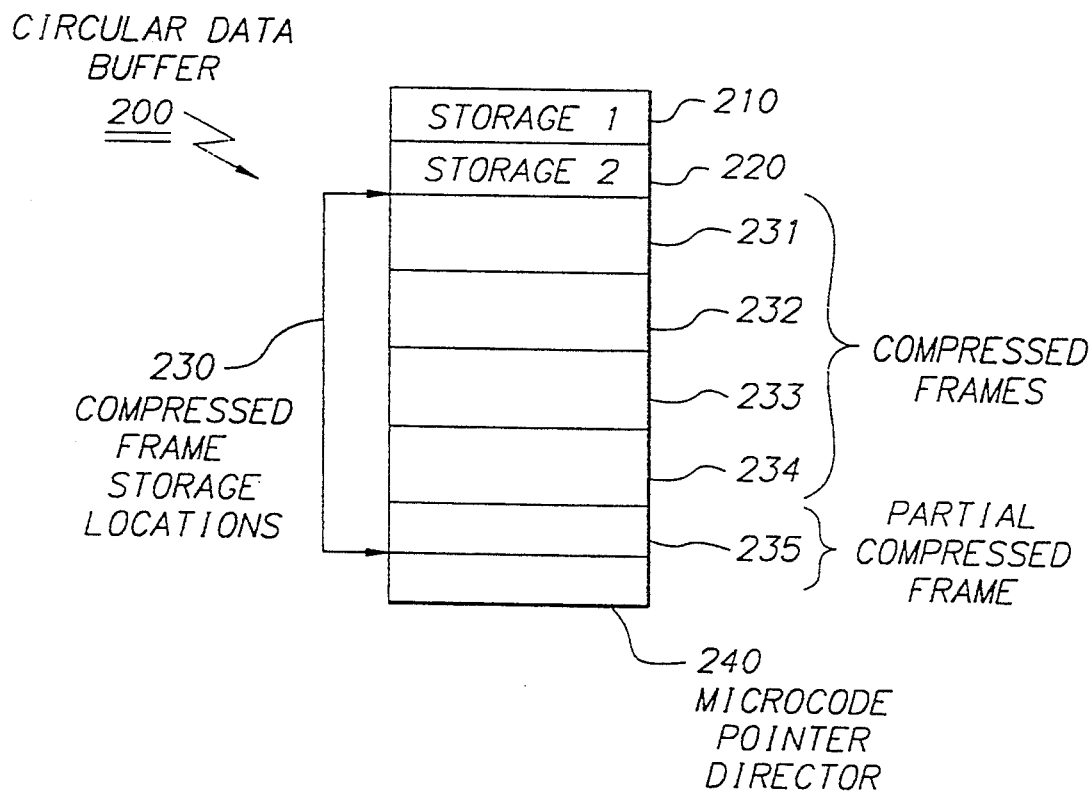
FIG. 2 shows an exemplary circular data buffer according to a preferred embodiment of the present invention.

FIG. 2 shows an exemplary circular data buffer 200 according to a preferred embodiment of the present invention. Circular data buffer 200 may operate in a display mode to store compressed digital video data received from a storage device. In its display mode, circular data buffer 200 functions substantially in accordance with circular buffer 120 of FIG. 1A. Alternatively, circular data buffer 200 may operate in a capture mode to store compressed digital video data provided from a capture system. In its capture mode, circular data buffer 200 functions substantially in accordance with circular buffer 160 of FIG. 1B. Circular data buffer 200 is a shared data structure which may by accessed both through a host processor and through a digital video processor such as the Intel model 82750PB processor. Storage location 210 is provided for storing a first pointer and storage location 220 is provided for storing a second pointer. In the preferred embodiment, the first pointer is used to identify the address of data processed by a host processing system (host pointer), and the second pointer is used to identify the address of data processed by microcode operating on a digital video processor (microcode pointer). In alternate embodiments, the first and second pointers may represent the addresses of data processed by multiple hosts, multiple audio processors, multiple video processors, or combinations thereof.

In the display mode, the host computer writes blocks of compressed video data from storage device 110 to circular data buffer 200. Each block of compressed video data transferred from the storage device 110 to circular data buffer 200 will typically not correspond to a whole number of compressed frames of video data. In addition, the frames of compressed video data provided from storage device 110 will typically not be of uniform size. Thus, in the exemplary data buffer of FIG. 2, block 230 of compressed digital video data is comprised of full compressed frames 231, 232, 233, 234 and partial compressed frame 235.

The host pointer stored in location 210 points to the end of the last full compressed frame which has been written to buffer 200 by the host computer. The microcode pointer stored in location 220 points to the compressed video data currently being decompressed by microcode operating on the digital video processor. The microcode determines whether a compressed frame is present and ready for decompression in buffer 200 by comparing the position of the microcode pointer to that of the host pointer. More particularly, the microcode will determine that a compressed frame is ready for decompression if the host pointer is ahead of the microcode pointer. The host computer determines whether the compressed data in buffer 200 has been operated on by the microcode before writing over that data by monitoring the position of the microcode pointer. The host will determine that an area or portion of buffer 200 can be re-written if the host pointer is behind the microcode pointer.

In the capture mode, the host computer writes blocks of compressed video data from circular data buffer 200 to storage device 150. Each block of compressed video data transferred from the circular data buffer 200 to storage device 150 will typically not correspond to a whole number of compressed frames of video data. In addition, the frames of compressed video data provided to the storage device 150 will typically not be of uniform size.

When operating in the capture mode, the host pointer stored in location 210 points to the end of the last block of compressed digital video data written to storage device 150. The microcode pointer stored in location 220 points to the end of the last full compressed frame which has been written to buffer 200 by the microcode operating on the digital video processor. The microcode determines whether space exists in buffer 200 to write additional compressed digital video data into the buffer by comparing the position of the microcode pointer to that of the host pointer. More particularly, the microcode will determine that a compressed frame may be written to buffer 200 if the host pointer is ahead of the microcode pointer. The host computer determines whether compressed data in buffer 200 is ready to be written to storage device 150 by monitoring the position of the microcode pointer. The host will determine that an area or portion of buffer 200 can be written to the storage device if the host pointer is behind the microcode pointer.

In both the display and capture modes, means 240 is located at the bottom of buffer 200 and is provided for directing the microcode pointer back to the top of buffer 200. Means 240 is preferably implemented by storing a software GOTO statement at the bottom of buffer 200. In an alternative preferred embodiment, a hardware assist may be provided to direct the microcode pointer to the top of buffer 200 once the bottom of the buffer has been reached.

Referring now to FIG. 1A, in a further aspect of the present invention, a system 400 is provided for managing a queue 130 of decompressed digital video frames 132, 134, 136 for display. Frames 132, 134, 136 may represent either still images or interframe difference images. A still image can be copied directly from queue 130 to display 140; an interframe difference image must be applied to at least one other frame (a reference frame) in queue 130 with the result being copied to display 140.

Figure 3:
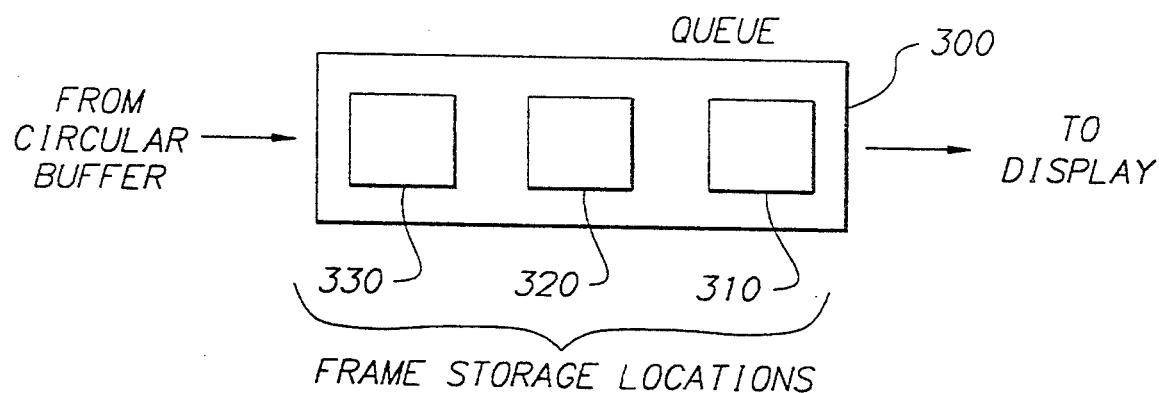
FIG. 3 shows an exemplary queue for storing decompressed frames of digital video data for display according to a preferred embodiment of the present invention.

Referring now to FIG. 3, there is shown an exemplary queue 300 for storing decompressed frames of digital video data for display according to a preferred embodiment of the present invention. Queue 300 functions substantially in accordance with queue 130 of FIG. 1A. Queue 300 is comprised of storage locations 310, 320 and 330. In the example of FIG. 3, the queue management system writes a sequence of decompressed frames to queue 300 in circular fashion by writing the first frame in the sequence to storage location 310, the second frame to storage location 320 and the third frame to storage location 330. The fourth frame is then written over the first frame in storage location 310, the fifth frame is written over the second frame in storage location 320, and so on.

Figure 4:
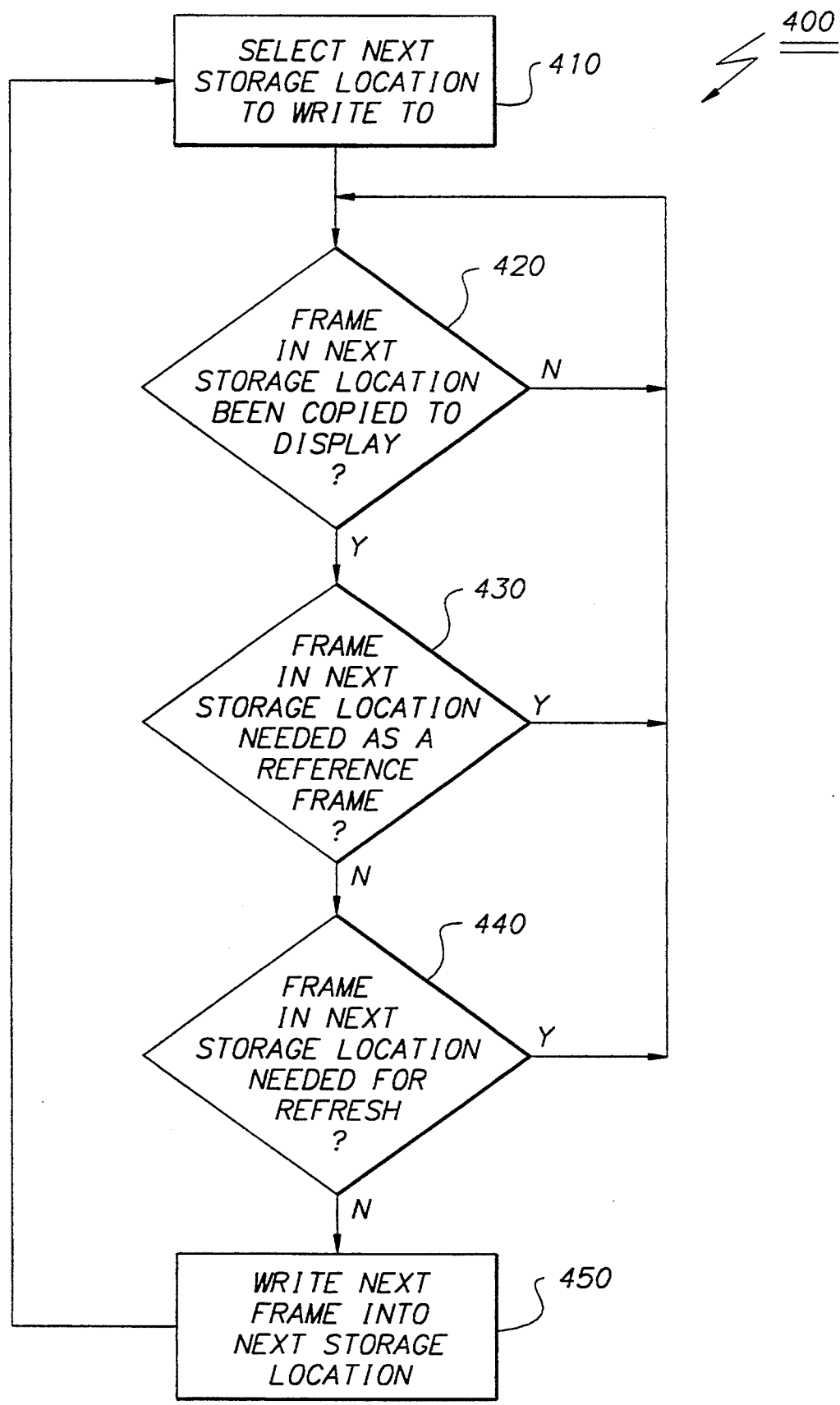
FIG. 4 is a flow diagram illustrating the operation of a queue manager according to a preferred embodiment of the present invention.

Referring now to FIG. 4, there is shown a flow diagram illustrating the operation of a queue manager 400 according to a preferred embodiment of the present invention. The queue manager is provided with means 410 for selecting the next storage location in queue 300 which will be available to receive the next uncompressed frame generated by the decompression system. Means 420 determines whether the frame currently stored in the next storage location has been copied to the display, means 430 determines whether the frame currently stored in the next storage location is needed as a reference frame, and means 440 determines whether the frame currently stored in the next storage location may be needed to refresh the display. If the frame in the next storage location (i) has been copied to the display, (ii) is not needed as a reference frame, and (iii) will not be needed to refresh the display, then means 450 writes the next uncompressed frame generated by the decompression system into the next selected storage location. If one or more of the above three conditions is not satisfied, the queue management system waits until all three conditions are satisfied before writing into the next storage location. In a preferred embodiment, all frames in the queue which were needed to make the image currently being displayed are deemed to be needed to refresh the display.

Figure 5:
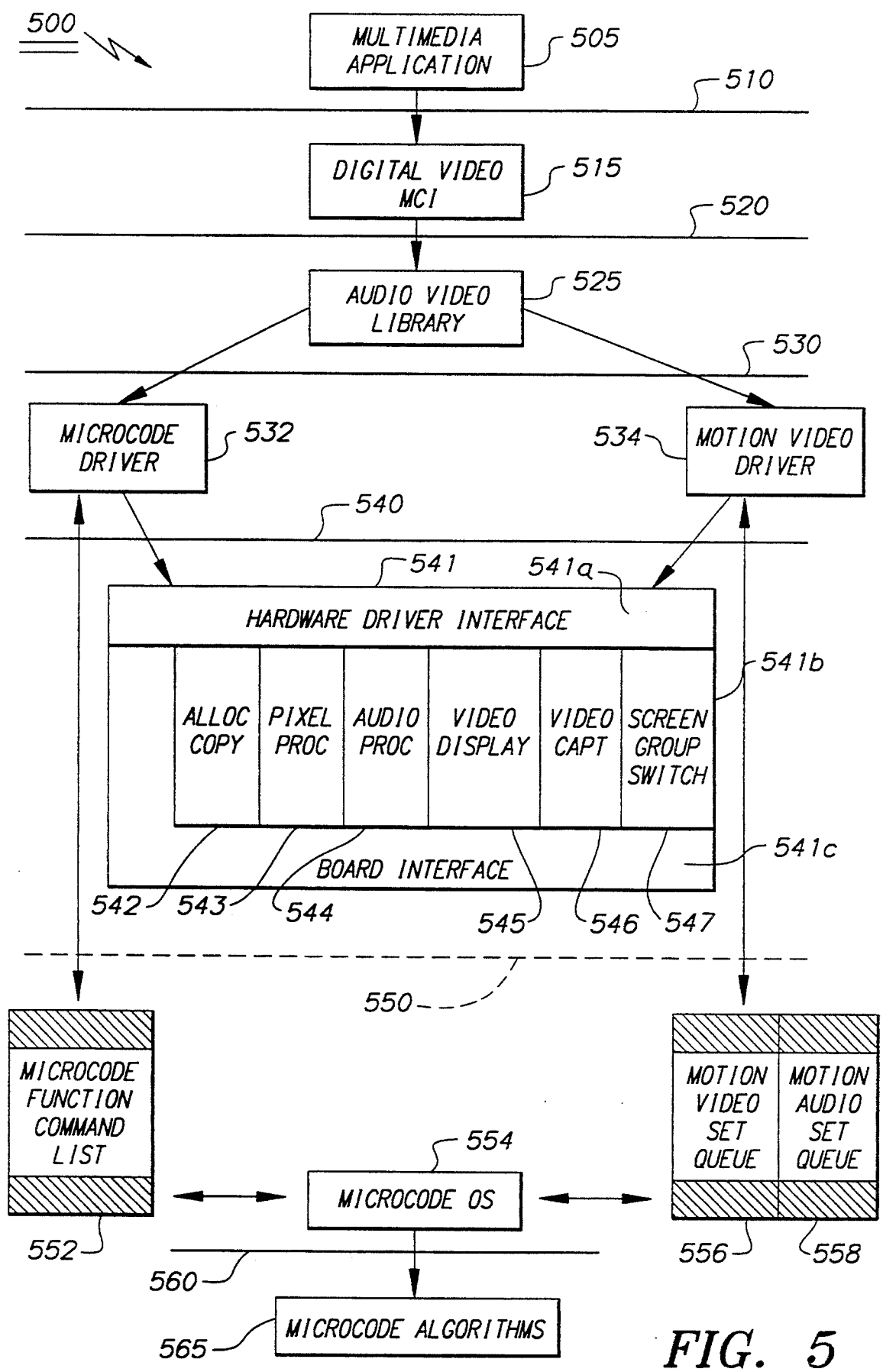
FIG. 5 shows the structure of an overall system which is portable across various hardware environments and operating systems for supporting multimedia application software on a host computer.

FIG. 5 shows the structure of an overall system 500 which is portable across various hardware environments and host operating systems for supporting multi-media application software 505 on a host computer. Digital Video Media Control Interface ("Digital Video MCI") 515 provides a set of commands which allow application 505 to communicate with system 500 through the host operating system. Digital Video MCI 515 allows application 505 to manipulate digital video files by issuing commands such as "open device", "play file", "record", "pause", "stop" and "close" to the host operating system, and can be thought of as an extension to the host operating system that supports multimedia applications. MCI Application Program Interface ("MCI API") 510 is provided for passing commands from application 505 to Digital Video MCI 515.

Digital Video MCI 515 communicates with Audio Video Library ("AVL") 525 through AVL Application Program Interface 520. AVL implements several digital data types used for manipulating motion video and audio. These data types are generalized into "streams" which are collected together into "groups." A stream group is simply a collection of one or more streams that need to be controlled synchronously. Control functions such as play, pause, stop, and frame advance, operate on groups. AVL implements these control functions as well as read and write data functions for capture and display data buffers. AVL also provides control over the attributes of these data types. For example, functions for adjusting the volume of an audio stream or for adjusting the tint on a video stream are provided. This layer is largely platform-independent and therefore easily portable across hardware environments and operating systems. AVL also includes a set of C functions that are used internally for VRAM memory management, bitmap formatting, and for generating and managing command lists.

AVL 525 communicates with Microcode Driver ("MCD") 532 and Motion Video Driver ("MVD") 534 through an Audio Video Driver Application Program Interface 530. MCD 532 is provided for loading and running microcode functions, allocating and accessing device memory and defining bitmaps, display and capture functions. MCD 532 loads functions on Microcode Function Command List 552 by passing commands to Microcode Function Command List 552 through Microcode Data Interface 550.

MVD 534 provides a high level interface to microcode operating system 554 and allows for play and capture of audio and video with dynamic play control. MVD 534 also defines buffers 120, 160 (for storing compressed audio and video data) and streams (such as queues 130, 170) for storing uncompressed audio and video data) through Motion Video Set Queue 556 and Motion Audio Set Queue 558. Set Queues 556, 558 represent host/microcode shared memory data structures. A master command list processing task executes microcode functions requested by the host via Set Queues 556, 558. This architecture allows the host to dynamically program a digital video processor (such as an Intel model 82750PB processor) by placing commands on a set queue. MVD 534 passes commands to Set Queues 556, 558 via Microcode Data Interface 550. Microcode operating system 554 accesses microcode algorithms 565 (i.e., MPEG or JPEG) via algorithm interface 560.

Hardware Driver 541 is comprised of Hardware Driver Interface 541a, Hardware Interface Library 541b and Multi-media Board Interface 541c. Hardware driver interface 541a is a device-independent hardware interface that initializes a multi-media board, allocates and copies memory, loads microcode functions and formats display and capture systems. Hardware driver interface 541a communicates with MCD 532 and MVD 534 through Hardware Driver Interface Application Program Interface 540. Hardware Interface Library 541b is a device-dependent hardware library with individual modules for various hardware components on the multi-media board. Hardware Interface Library includes module 542 for allocating and copying memory on a DRAM or VRAM, module 543 for pixel processing, module 544 for audio processing, module 545 for video display, module 546 for video capture and module 547 for screen group switching. Modules 543, 544, 545, 546 and 547 are written to interface with specific chips on a multi-media board.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for processing for display a sequence of frames of digital motion video data through two circular buffers, each having a plurality of data address locations, comprising the steps of:

(A) writing a sequence of frames of compressed digital motion video data including a first frame, one or more intermediate frames, and a last full frame, each of said frames having a beginning and an end, to a first circular buffer;

(B) setting a first pointer indicative of the first circular buffer data add address location corresponding to the end of the last full frame of compressed digital motion video data written to said first circular buffer in step (A);

(C) setting a second pointer indicative of the first circular buffer data address location corresponding to a remove address;

(D) comparing the location of said first pointer with the location of said second pointer;

(E) based on the comparison of step (D), determining whether a portion of said first circular buffer can be rewritten with additional new frames of compressed digital motion video data;

(F) decompressing and removing said sequence of frames of compressed motion video data from said first circular buffer;

(G) transmitting in sequence the decompressed frames of motion video data resulting from step (F) to a second circular buffer;

(H) in a manner equivalent to steps (B), (C), (D), and (E), determining whether a portion of said second circular buffer can be rewritten with said decompressed frames;

(I) if the determination of step (H) is affirmative, writing said decompressed frames to said second circular buffer;

(J) in sequence, transmitting said decompressed frames from said second circular buffer to a display device;

(K) determining in sequence whether each of said decompressed frames that have been transmitted to said display device is still needed to refresh said display device;

(L) determining in sequence whether each of said decompressed frames that have been transmitted to said display device is still needed as a reference frame for decompression of future frames; and, (M) if the determinations of steps (K) and (L) are both negative, deleting in sequence said decompressed frames from said second circular buffer in order to make room for new frames and, (N) if the determination of step (L) is affirmative, using said reference frames for decompression of future frames.

2. Apparatus for processing for display a sequence of frames of digital motion video data through two circular buffers, each having a plurality of data address locations, comprising:

means for writing a sequence of frames of compressed digital motion video data including a first frame, one or more intermediate frames, and a last full frame, each of said frames having a beginning and an end, to a first circular buffer;

means for setting a first pointer indicative of the first circular buffer data add address location corresponding to the end of the last full frame of compressed digital motion video data written to said first circular buffer;

means for setting a second pointer indicative of the first circular buffer data address location corresponding to a remove address;

means for comparing the location of said first pointer with the location of said second pointer;

means responsive to an output signal from said means for comparing, for determining whether a portion of said first circular buffer can be rewritten with additional new frames of compressed digital motion video data;

means for decompressing and removing said sequence of frames of compressed motion video data from said first circular buffer;

means for transmitting in sequence the decompressed frames of motion video data, produced by said means for decompressing and removing, circular buffer;

first means for determining whether a portion of said second circular buffer can be rewritten with said decompressed frames;

means responsive to an output signal from said first means for determining, for writing said decompressed frames to said second circular buffer;

means for transmitting, in sequence, said decompressed frames from said second circular buffer to a display device;

second means for determining, in sequence, whether each of said decompressed frames that have been transmitted to said display device is still needed to refresh said display device;

third means for determining, in sequence, whether each of said decompressed frames that have been transmitted to said display device is still needed as a reference frame for decompression of future frames;

means, responsive to negative output signals from said second means for determining and said third means for determining, for deleting, in sequence, said decompressed frames from said second circular buffer in order to make room for new frames; and, means, responsive to a positive output of said third means for determining, for using said reference frames for decompression of said future frames.

* * * * *